United States Patent [19]

Shigeta et al.

[11] Patent Number: 5,239,475
[45] Date of Patent: Aug. 24, 1993

[54] DATA PREPARING APPARATUS

[75] Inventors: Katsunori Shigeta; Haruyuki Nakamura; Noriko Akama, all of Aichi, Japan

[73] Assignee: Mitsubishi Denki K.K., Tokyo, Japan

[21] Appl. No.: 684,071

[22] Filed: Apr. 12, 1991

[30] Foreign Application Priority Data

Sep. 21, 1990 [JP] Japan .................. 2-253838

[51] Int. Cl.⁵ .................. G06F 15/46; D05B 3/02
[52] U.S. Cl. .................. 364/470; 364/191; 112/456; 112/458
[58] Field of Search .................. 364/470, 148-151, 364/578, 188, 189, 191-193, 156, 578, 164, 165; 395/902, 903, 904, 920, 3, 61; 112/121.11, 121.12, 12.13, 453-458

[56] References Cited

U.S. PATENT DOCUMENTS

| | | | |
|---|---|---|---|
| 4,835,699 | 5/1989 | Mallard | 364/470 |
| 4,893,250 | 1/1990 | Sainen | 364/470 |
| 5,034,897 | 7/1991 | Sainen | 364/470 |
| 5,056,445 | 10/1991 | Orii | 395/904 X |
| 5,057,757 | 10/1991 | Orii | 395/900 X |
| 5,060,161 | 10/1991 | Sainen | 364/470 |

FOREIGN PATENT DOCUMENTS

| | | |
|---|---|---|
| 148582 | 5/1985 | Japan . |
| 1603827 | 5/1978 | United Kingdom . |
| 2118328 | 10/1983 | United Kingdom . |
| 16023 | 12/1990 | World Int. Prop. O. . |

OTHER PUBLICATIONS

Krause, F. L., et al, EDCAD-Bausteine fur die Simulation von Bearbeitungsablaufen; 1990.
Yang, D. C. H., et al, Part Set-up Angle for Optimal Machining Time in CAD/CA; 1989.

Primary Examiner—Joseph Ruggiero
Attorney, Agent, or Firm—Sughrue, Mion, Zinn, Macpeak & Seas

[57] ABSTRACT

A data preparing apparatus includes an input device for inputting coordinate data such as a configuration and pattern to be processed and processing conditions, a memory device for converting the coordinate data inputted by the input device into variable coordinate data varying relatively according to the processing conditions and storing the variable coordinate data as a pattern data for processing, a predicting device for predicting a processing information resulting from a processing performed on the basis of the pattern data stored in the memory device and an output device for outputting the processing information obtained by the predicting device. The processing information includes at least one of a processing time, an area to be processed and a processing path. The predicting device calculates a processing time according to a preset processing rate.

16 Claims, 15 Drawing Sheets

| PATTERN INPUT | START | SCALE | 1 | 2 | 3 | HIGH SPEED | POINT INPUT | PLK-A2016 | THREAD CUT | RETURN TO START POINT | RESET |
|---|---|---|---|---|---|---|---|---|---|---|---|
| WRITE | WRITE/READ START | STITCH LENGTH | 4 | 5 | 6 | MIDDLE SPEED 1 | LINEAR INPUT | PLK-A3530 | INTERMEDIATE STOP | END | CLEAR |
| READ | | PATTERN NO. | 7 | 8 | 9 | MIDDLE SPEED 2 | | PLK-A1710 | IDLE FEED | SECOND START POINT | |
| SEWING TIME | TIME SEGMENTATION | LIST DISPLAY | 0 | . | | LOW SPEED | | PLK-A1006 | | | 1ST STITCH Eliminate |

| PATTERN INPUT | START | SCALE | | 1 | 2 | 3 | HIGH SPEED | POINT INPUT | PLK-A2016 | THREAD CUT | RETURN TO START POINT | RESET |
|---|---|---|---|---|---|---|---|---|---|---|---|---|
| WRITE | WRITE/READ START | STITCH LENGTH | | 4 | 5 | 6 | MIDDLE SPEED 1 | LINEAR INPUT | PLK-A3530 | INTERMEDIATE STOP | END | CLEAR |
| READ | | PATTERN NO. | | 7 | 8 | 9 | MIDDLE SPEED 2 | | PLK-A1710 | IDLE FEED | SECOND START POINT | |
| SEWING TIME | TIME SEGMENTATION | LIST DISPLAY | | 0 | . | | LOW SPEED | | PLK-A1006 | | | 1ST STITCH Eliminate |

11A 12a
12b
12

10

13 PATTERN INPUT PORTION

| PATTERN INPUT | START | | 1 | 2 | 3 | HIGH SPEED | POINT INPUT | | THREAD CUT | RETURN TO START POINT | RESET |
|---|---|---|---|---|---|---|---|---|---|---|---|
| WRITE | WRITE/READ START | | 4 | 5 | 6 | MIDDLE SPEED 1 | LINEAR INPUT | 2716 | INTERME-DIATE STOP | END | CLEAR |
| READ | PATTERN No. | | 7 | 8 | 9 | MIDDLE SPEED 2 | | 2732 | IDLE FEED | SECOND START POINT | |
| SIZE DISPLAY | | | 0 | . | | LOW SPEED | | 2732A | | | 1ST STITCH ELIMINATE |

11A

| PATTERN INPUT | START | SCALE | 1 | 2 | 3 | HIGH SPEED | POINT INPUT | PLK-A2016 | THREAD CUT | RETURN TO START POINT | RESET |
|---|---|---|---|---|---|---|---|---|---|---|---|
| WRITE | WRITE/READ START | STITCH LENGTH | 4 | 5 | 6 | MIDDLE SPEED 1 | LINEAR INPUT | PLK-A3530 | INTERMEDIATE STOP | END | CLEAR |
| READ | | PATTERN NO. | 7 | 8 | 9 | MIDDLE SPEED 2 | | PLK-A1710 | IDLE FEED | SECOND START POINT | |
| | | LIST DISPLAY | 0 | . | | LOW SPEED | | PLK-A1006 | | | 1ST STITCH ELIMINATE |

DATA PREPARING APPARATUS

BACKGROUND OF THE INVENTION

The present invention relates to an apparatus for preparing pattern data for an industrial machine for processing a workpiece along a desired path. Although the present invention will be described hereinafter with reference to an industrial sewing machine as an example of the industrial machine, the present invention is not limited to such a sewing machine. For example, the present invention can be equally applied to a welding machine or other machines so long as they work along a given path.

Among industrial sewing machines, one by which a desired stitch pattern is formed on a cloth automatically by moving the latter along a flat surface while holding the cloth with pressure, according to sewing data preliminarily programmed and stored in a memory device thereof is known. Such sewing data are usually stored in a recording medium in the memory device such that sewing of any of different patterns can be done easily. As the recording medium, semiconductor memory, magnetic card or floppy disc, etc., may be used, in which informations of sewing machine operation are stored according to the sequence of stitching.

A construction of sewing data includes a control instruction concerning a relative positional shift of the cloth to a needle for each stitch, a moving rate of the cloth for each stitching and a control instruction for controlling the sewing machine and a motor for driving the sewing machine. A control information for each sewing pattern is formed as a collection of these control instructions for each stitch. Therefore, in order to perform a sewing of a desired sewing pattern with this sewing machine, it is necessary to prepare control data corresponding to the desired sewing pattern and store it on the recording medium.

FIGS. 8 and 10 are a perspective view of an example of a conventional sewing data preparating apparatus which is disclosed in, for example, Patent Application Laid Open No. 60-148582, and a hardware construction, respectively. On a front panel of the apparatus is a tablet digitizer 10 which includes a menu portion 11 for inputting data and a pattern input portion 13. A cursor 12 is used for selection on the menu portion 11 and acquisition of coordinate data from the pattern input portion 13. 20 depicts an LED display panel, 26 a CRT for displaying pattern data, which is equipped with a usual key board 50 including ten keys and alphabetic keys, etc. 18 depicts a floppy disc as a memory medium and 16 depicts a floppy disc driver for driving the floppy disc 18 to write sewing data into the floppy disc 18 or read it therefrom.

FIG. 9 shows a detail of the menu portion 11 and an example of the cursor 12 having a read portion 12a and a switch 12b.

An operation of this sewing data preparing apparatus will be described with reference to FIG. 10. By drawing a desired sewing pattern on the tablet digitizer 10 using the cursor 12, sewing data is produced by control operations to be performed mainly by a CPU 14, which is temporarily stored in a RAM 24. Then, the temporarily stored data is written in the floppy disc 18 by the floppy disc driver 16 through a gate 44 and the sewing machine 38 is driven by inserting the floppy disc 18 into the control device 40 as the sewing data recording medium. Settings of various modes during the data formation and operational procedures are displayed on a LED display panel 20 as I/O data through the gate 44. A program for writing the input data from the tablet digitizer 10 through a gate 48 to the floppy disc by the CPU 14 is stored in a system program ROM 22 and the CPU 14 performs required processings according to this program. X and Y coordinate data which are the input data from the tablet digitizer 10 are temporarily stored in the RAM 24 and the variation of the X and Y coordinate data which are stitch data obtained by operating the X and Y coordinate data, that is, the relative value data, are also stored temporarily in the RAM 24. In order to monitor the pattern data inputted from the tablet digitizer 10, a pattern display CRT 26 is provided. The sewing data stored by the CPU 14 in the RAM 24 is transformed into an image display data, stored through a gate 32 in an image data RAM 28 and displayed by a CRT control circuit 46 on the CRT 26 as a stitch pattern to thereby facilitate an input operation by an operator.

FIG. 11 shows an example of stitch pattern, an inputting method of which will be described in detail. First, a drawing bearing the stitch pattern shown in FIG. 11 is attached onto the pattern input portion 13 of the tablet digitizer 10 and then the read portion 12a of the cursor 12 is put on "pattern input" of the menu portion 11 and the switch 12b is depressed to set a pattern input state. Similarly, "scale", "1", "0", "0", "stitch length", "3", ".", "0", "low speed", "point input", "start" are depressed in the order to set the input condition. In this case, the scale is set to 100% so that the size of the drawing is equal to that of the input data, a stitch data of 3.0 mm is set is produced, the sewing speed is set at lower speed and the input method is set as point input.

Thereafter, the read portion 12a of the cursor 12 is put at an original point O in FIG. 11 and the switch 12b is depressed to input the original point. Subsequently, "idle feed", point A→point B→"linear input", "high speed", point C→"point input", "middle speed 1", point D →point E→"linear input", "high speed", point F→ "intermediate stop", point G→"point input", "middle speed 1", point H→point I→"linear input", "high speed", point J→"idle feed", Original point O→"end" are inputted in the order by the cursor 12 for selection on the menu portion 11 and stitch pattern.

Thus, the input operation of the stitch pattern shown in FIG. 11 is completed. During this procedure, the scale value, the stitch length, the speed instruction value and the input method are displayed on the LED display panel 20 and the stitch pattern is displayed on the CRT 26.

FIG. 12 shows a flowchart of data processing corresponding to the above mentioned input procedures. When the switch 12b of the cursor 12 is depressed in the step S1, the coordinate data are read in the step S2 and it is determined in the step S3 whether the read data is for the selection in the menu portion 11 or the stitch pattern. If it is the former, it is determined in the step S5 which menu is selected and a processing corresponding to the selected menu is performed in the step S6. On the other hand, when it is decided in the step S3 that the stitch pattern is selected, the coordinate data readout in the step S4 is processed and a processing for formation of sewing data with the result of the step S6 and for display them on the LED display panel is performed in the step S7. Thereafter, processings for display of the formed sewing data on the CRT 26 or writing it in the floppy disc are performed.

Since the conventional sewing data preparing apparatus for a sewing machine is constructed as mentioned above, it is possible, by selecting "list display" of the menu portion 11, to recognize the sewing data prepared by inputting sewing speed, feed amount and other control instructions for each stitch before a sewing operation. However, it is impossible to preliminarily know a sewing time necessary for a sewing machine to perform the required sewing because it varies depending upon not only the sewing speed per stitch which can be shown on the "list display" but also the type of the sewing machine and stitch length. In order to know the sewing time of the sewing machine, it must be actually measured by using a stop watch, etc.

Further, when the sewing data written in the floppy disc overflows a sewing range of the machine, the fact can not be known unless a sewing is actually performed.

SUMMARY OF THE INVENTION

The present invention was made to solve these problems and an object of the present invention is to provide a data preparing apparatus which makes it possible to obtain processing information which, in a case of a sewing machine, includes sewing time and/or sewing size which, in conventional apparatus, can not be known unless an actual sewing is performed before such actual sewing is performed.

In one aspect of the present invention, a data preparing apparatus comprises input means for inputting data related to a sewing, means for preliminarily obtaining a sewing information otherwise obtainable by actually driving a machine on the basis of the data inputted by this input means by processing the data and display means for displaying the data obtained by this means.

In another aspect of the present invention, a data preparing apparatus comprises input means for inputting data related to a work, segmenting means for segmenting a working path prepared on the basis of the data inputted by the input means, means for preliminarily obtaining working information otherwise obtainable by actually driving a machine on the basis of the data inputted by processing the data for each segment of the working path and means for displaying the data obtained by this means.

In a further aspect of the present invention, a data preparing apparatus comprises input means for inputting data related to a work, memory means for storing speed data unique to each of different types of machine, selecting means for selecting one of the machine types, means for preliminarily obtaining working time otherwise obtainable by actually driving the machine on the basis of the data inputted by processing the data for each machine type selected by the selecting means and means for displaying the time obtained by this means.

In a still further aspect of the present invention, a data preparing apparatus comprises input means for inputting data related to a work, means for preliminarily obtaining lateral and longitudinal size of at least either of pattern size and working size otherwise obtainable by actually driving a machine on the basis of the data inputted by this input means by processing the data and means for displaying the size obtained by this means.

DETAILED DESCRIPTION OF THE PREFERRED EMBODIMENTS

Figure 1:
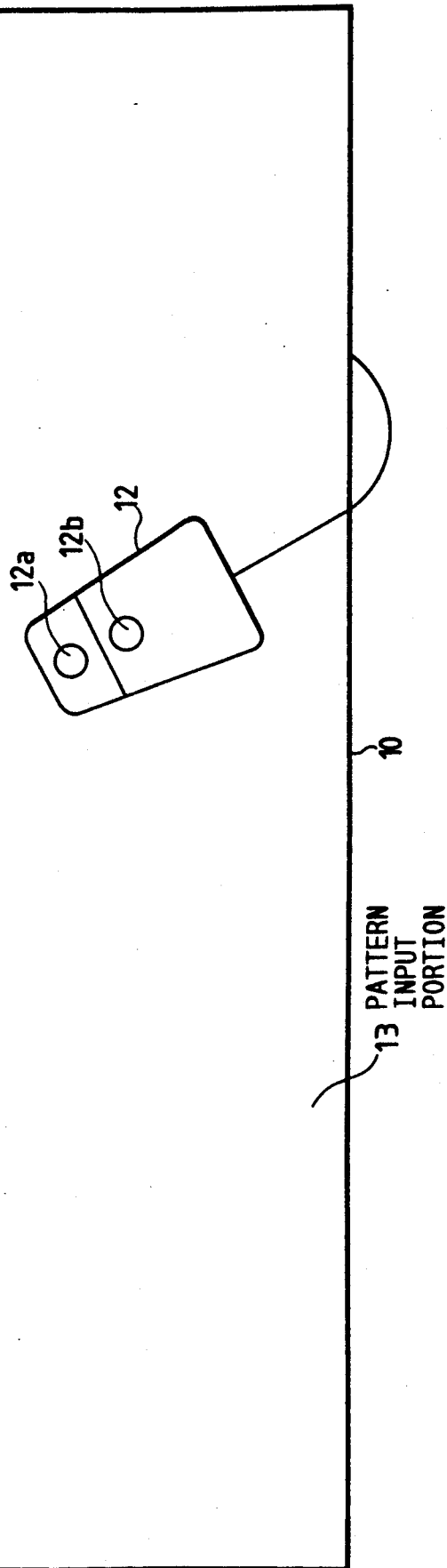
FIG. 1 shows a tablet digitizer and a cursor according to an embodiment of the present invention.

An embodiment of the present invention will be described with reference to FIGS. 1 to 4. FIG. 1 shows a construction of a tablet digitizer and a cursor. In the figure, 10 is a tablet, 11A is a menu portion which has, in addition to a conventional menu portion, a "sewing time" which indicates a sewing time and a "time segment" which indicates a segment when it is desired to display a partial sewing time, 12 is a cursor including a read portion 12a and a switch 12b, 13 is a sewing pattern input portion. When the switch 12b is depressed at a certain position of the sewing pattern input portion, the read portion 12a reads data in that position.

Figure 10:
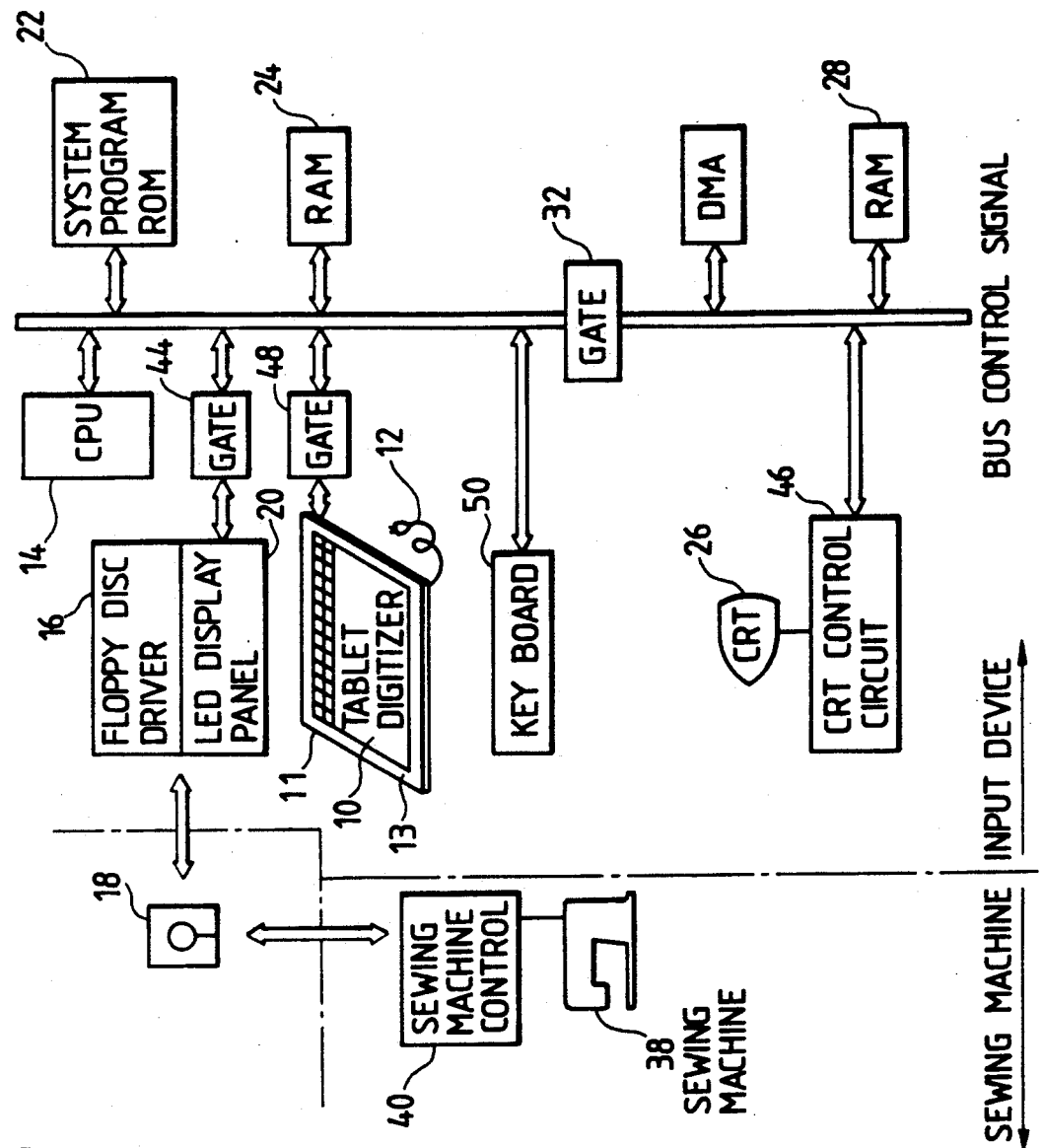
FIG. 10 shows a construction of a conventional sewing data preparing apparatus.

A hardware construction thereof is similar to that shown in FIG. 10.

Figure 11:
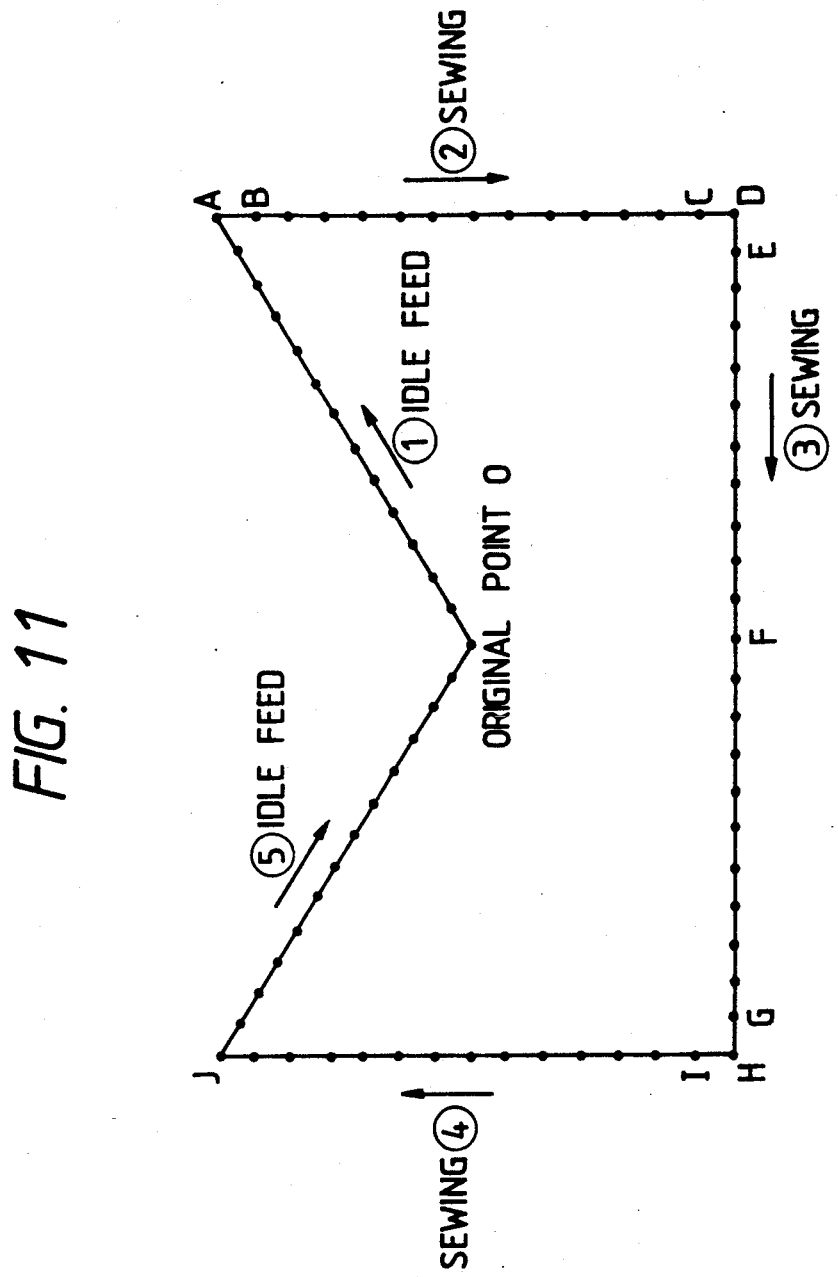
FIG. 11 shows an example of stitch pattern.
Figure 12:
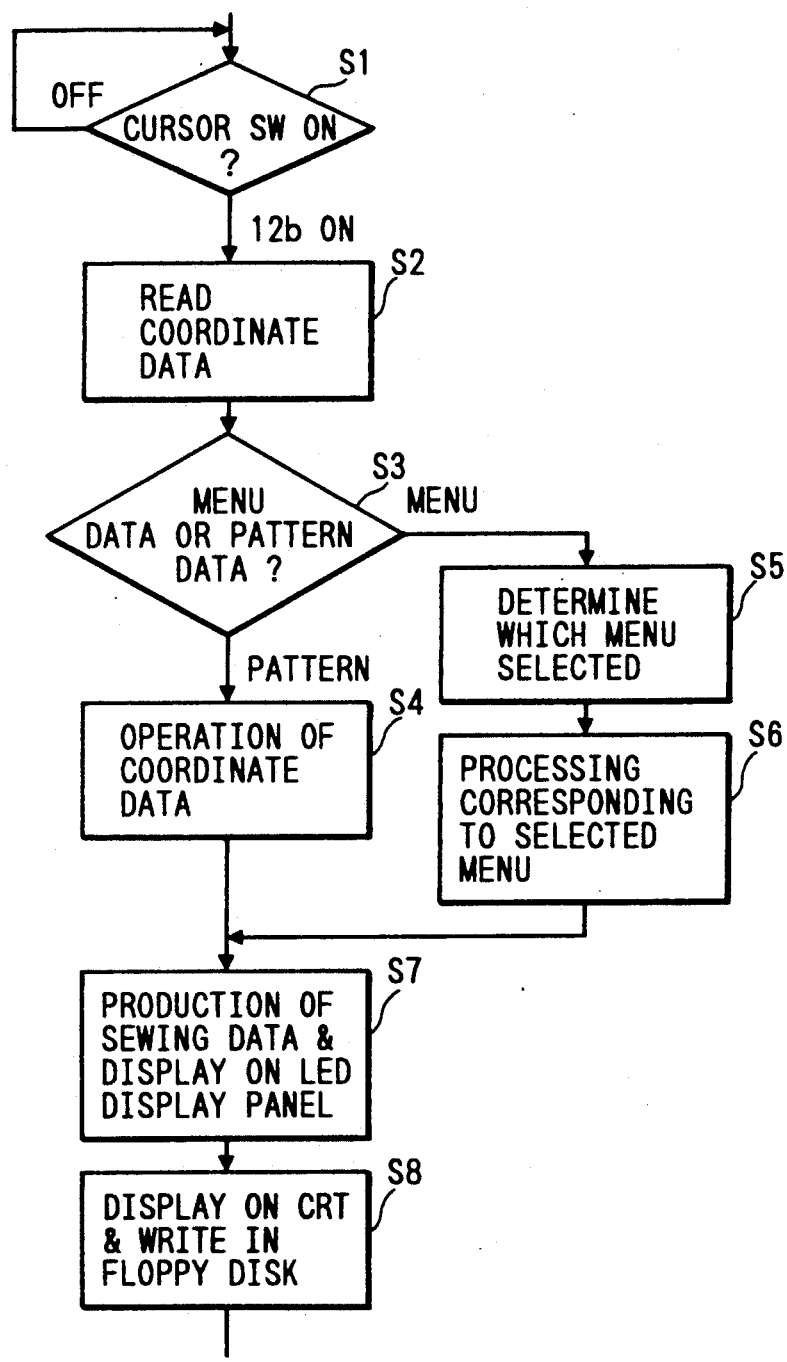
FIG. 12 is a flowchart showing an operation of the conventional apparatus.

A concrete input method and operation will be described with reference to a stitch pattern shown in FIG. 12 as an example. The input method is the same as that in the conventional sewing data preparing apparatus and, first, a drawing bearing the stitch pattern shown in FIG. 11 is attached onto the pattern input portion 13 of the tablet digitizer 10 and then the read portion 12a of the cursor 12 is put on a "pattern input" of the menu portion 11a. Then, the switch 12b is depressed to make a pattern input ready. Similarly, a input condition setting is performed by sequentially putting the read portion 12a in positions "scale", "1", "0", "0", "stitch length", "3", ".", "0", "low speed", "point input" and "start" with respective depressions of the switch 12b. In the above example, the scale is set as 100% so that the size of the drawing is made equal to the size of data. Thus, a stitch data of 3.0 mm is produced when two points are inputted. The sewing speed is set high in this example.

Thereafter, the read portion 12a of the cursor 12 is put on a start point O in FIG. 11 and the switch 12b is depressed to input the start position. Subsequently, data of "idle feed", point A→point B→"linear input", "high speed", point C→"point input", "middle speed 1", point D →point E→"linear input", "high speed", point F→"linear input", "high speed", point J→"idle feed", original point O→"end" on the menu portion 11a are inputted by the cursor 12 in the order to select the menu portion 11A and respective points of the stitch pattern.

With the above operations, the input of the stitch pattern shown in FIG. 11 is completed. The scale value, the stitch length, the speed instruction value and the input method during this operation are displayed on the LED display panel 20.

By operating the switch 12b of the cursor 12 in the input operation mentioned above, the sewing data is formed sequentially and stored in the RAM 24. Further, in order to display the position, an absolute value of the sewing data with reference to the input original point position is stored in the RAM 28.

Figure 2A:
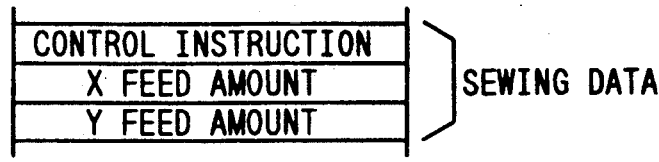
FIGS. 2a and 2b show a construction of sewing data usable in the present invention.
Figure 2B:
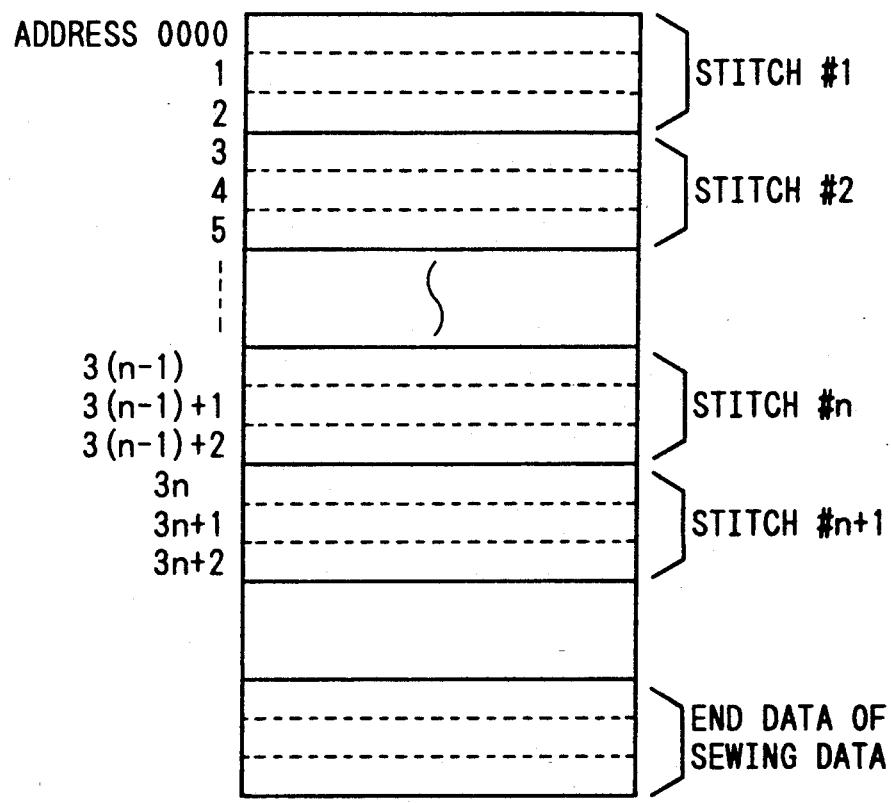

FIGS. 2a and 2b show a construction of sewing data stored in the RAM 24 by the above mentioned input operation. FIG. 2a shows one unit of sewing data for each stitch. In a first byte, control instruction such as code for idle feed and/or sewing, instructed speed, etc., is stored, in a second byte, a feed amount of sewing or idle feed data in X direction is stored and in a third byte a feed amount of sewing or idle feed data in Y direction is stored. The units of sewing data each mentioned above are stored in predetermined addresses from a first stitch to the end data which is one of the control instructions of sewing data in the sequence of input as shown by FIG. 2b.

FIGS. 2a and 2b are combined to show a flowchart of operation of the present invention. The operation will be described with reference to this flowchart.

When the switch 12b of the cursor 12 shown in FIG. 1 operates "sewing time", the operation enters into a mode for calculating and displaying sewing time in the step S31. In the step S32, the type of sewing machine is selected from "PLK-A2016", "PLK-A3530", "PLK-A1710" and "PLK-A1006" of the menu portion 11 and inputted.

In the step S34, a sewing time for each stitch is calculated and accumulated in an accumulation area cleared in the step S33 to obtain a sewing time for one pattern which is displayed on the CRT in the step S35.

Figure 3A:
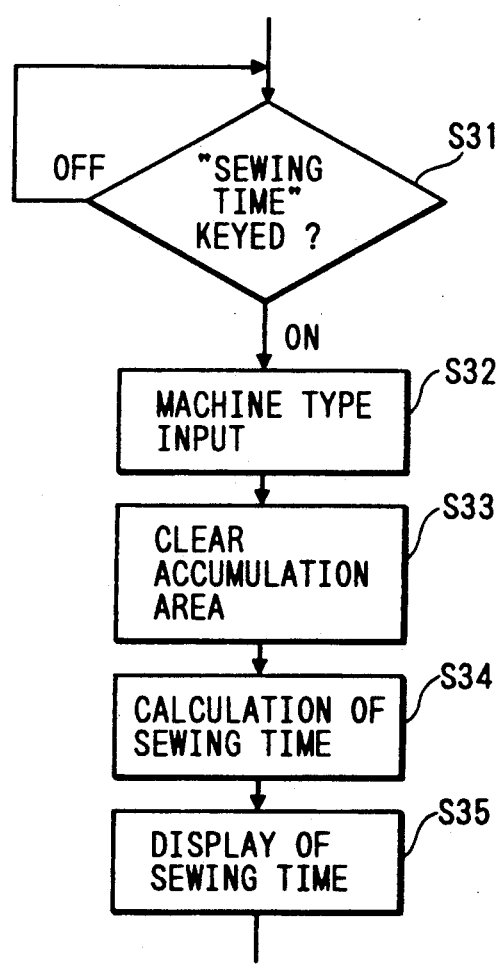
FIGS. 3a and 3b show an operation flowchart of the embodiment of the present invention.
Figure 3B:
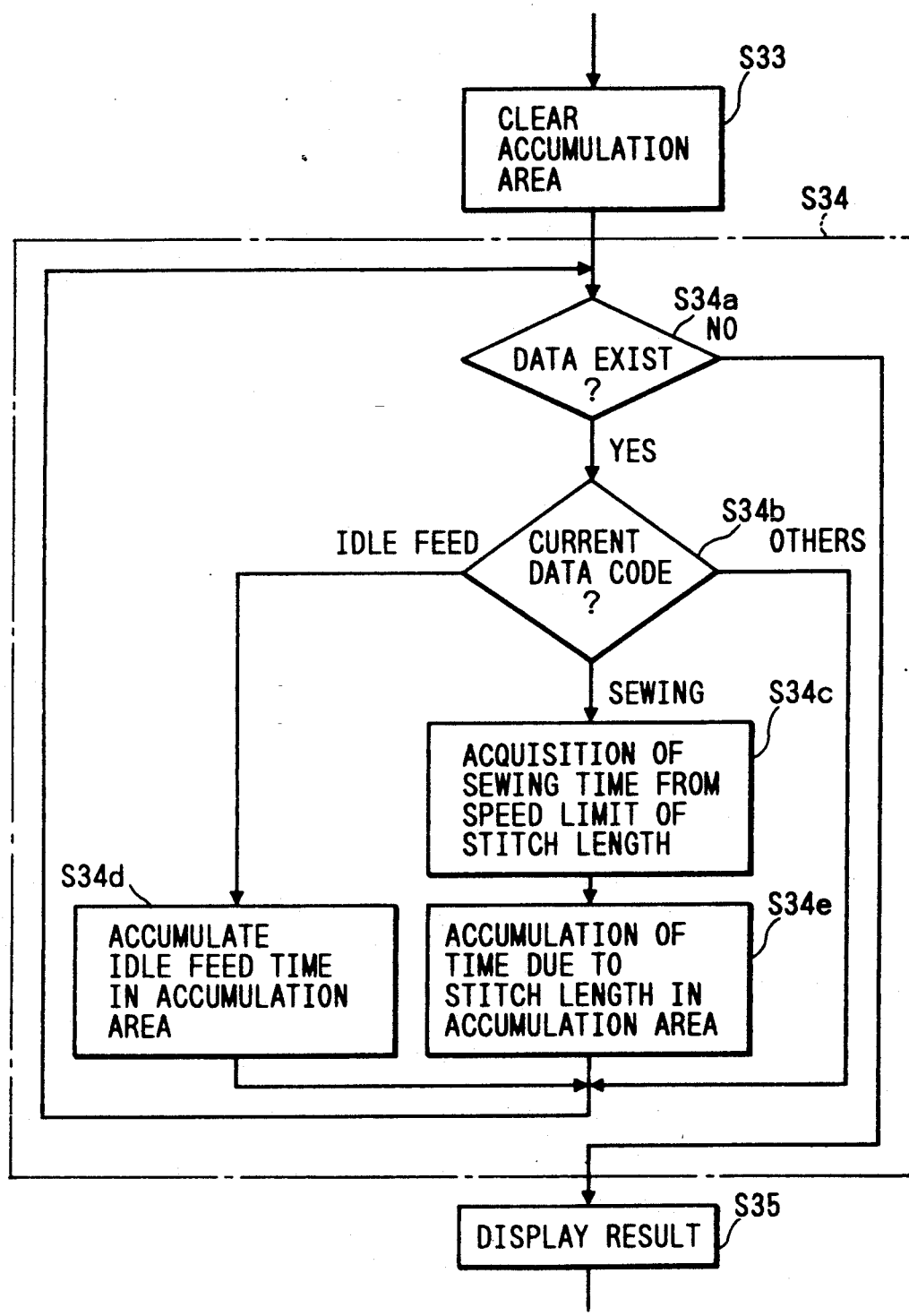

The calculation of the sewing time in the step S34 will be described with reference to FIG. 3b.

In the step 34a, it is determined whether or not all data have been checked and if yes sewing time accumulated up to this time is displayed in the step S35. If there is any data left as to be checked, its code is determined by checking the control instruction portion of the data in the step S34b. When the code is idle feed, time necessary for idle feed set in the side of the sewing machine (for example, set to 15 ms/stitch when 3.00 mm/stitch, regardless of sewing machine type) is accumulated in the accumulation area. If it is sewing, sewing time is obtained (the step S34c) by taking speed limit of stitch length preset for each sewing machine type into consideration so that a beautiful stitching is obtained, and accumulated in the accumulation area in the step 34e.

In the case of sewing, since a table such as below, that is, a table of speed dial (provided in a sewing machine whose sewing speed can be changed during sewing), rotation number of sewing machine and speed limit of stitch length, is stored preliminarily in the data preparing apparatus for each sewing machine type, the sewing time is obtained by using this table of the key-inputted machine type from the menu portion 11 and taking the speed limit of stitch length preset for each machine type so that a beautiful stitching (as is clear from the shown table, when the stitch length is, for example, 3.3 mm, the rotation number of the sewing machine is limited to 1800 spm even if the speed dial is set to, for example, "9") is obtained.

| speed dial | rotation number sewing machine | speed limit stitch length |
| --- | --- | --- |
| 0 | 200 spm | ↓ |
| 1 | 400 spm | |
| 2 | 600 spm | 11.00–12.7 mm |
| ↓ | ↓ | ↓ |
| 8 | 1800 spm | 3.1–3.3 mm |
| 9 | 2000 spm | 0.1–3.0 mm |

The accumulation of sewing time for each stitch data in the step S34a is repeated a certain number of times corresponding to the number of stitches for one pattern.

Figure 4A:
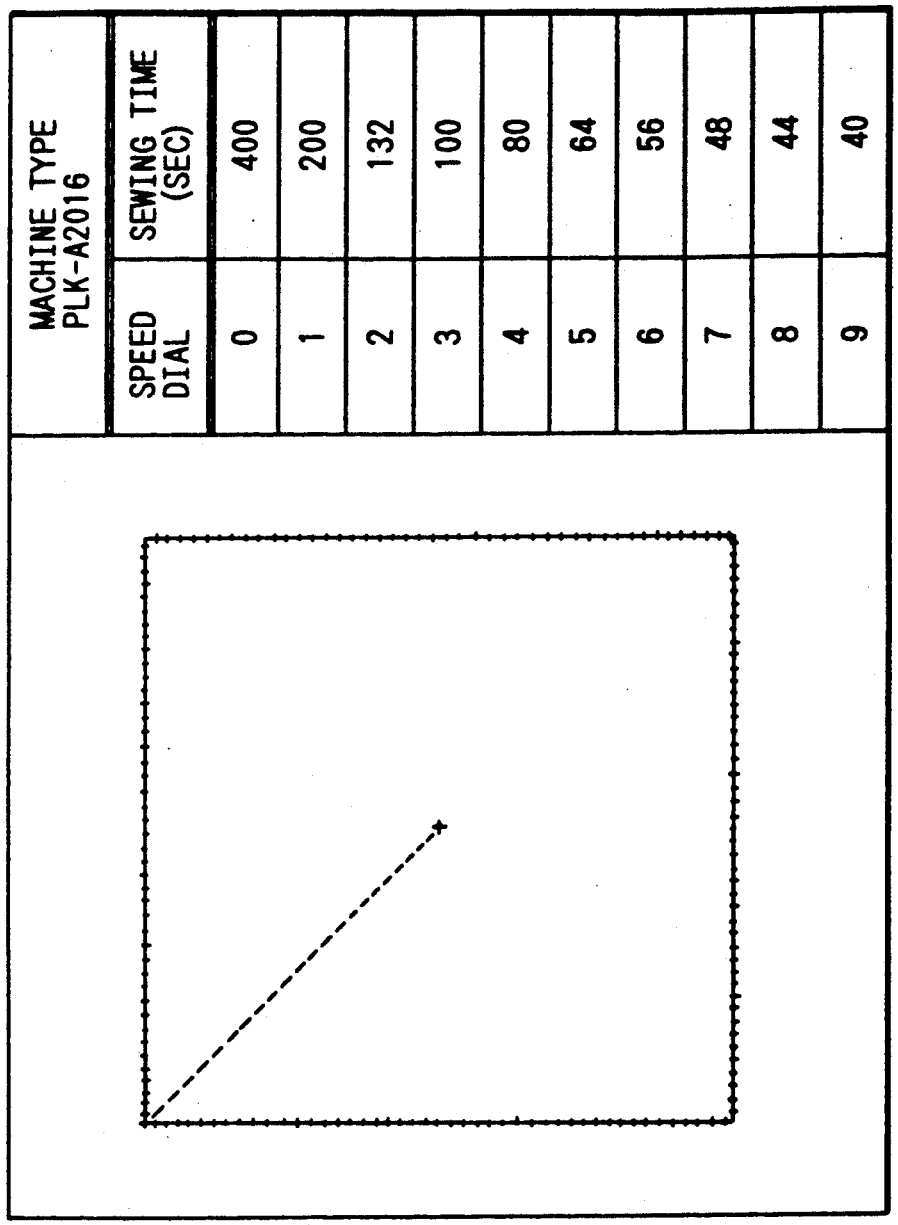
FIGS. 4a and 4b show an example of display obtainable in the embodiment of the present invention.

FIG. 4a shows an example of display in one embodiment of the present invention when the type "PLK-A2016" sewing machine is selected and the speed dial setting is considered.

When a symbol of time segmentation is added to the pattern data by using "time segmentation" key, a sewing time from a start of the pattern data to a segmented time position and a sewing time for subsequent data can be displayed for every sewing portion.

The number of "time segmentation" symbols may be arbitrary.

Figure 4B:
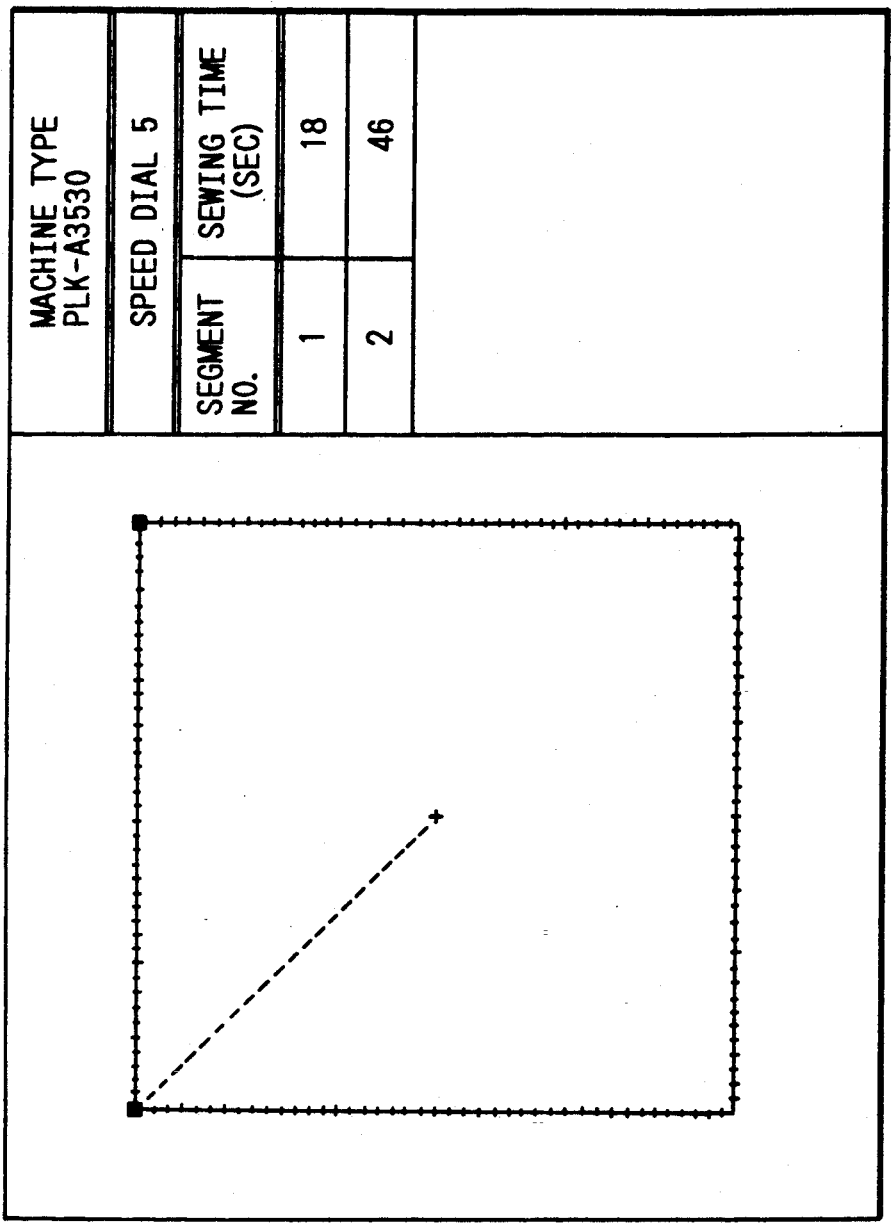

FIG. 4b shows an example of display when the "time segmentation" key is used. Symbol ■ in the pattern data represents a position to be segmented and it is shown that sewing time from the start of sewing to the stitch marked by the symbol ■ is 18 seconds and the sewing time subsequent to the symbol ■ is 46 seconds. The sewing machine type in this example is "PLK-A3530" and the speed dial setting is 5.

In the mentioned embodiment, the sewing time for one sewing of one pattern is obtained. A sewing time when a sewing of a certain pattern is repeated several times or a plurality of patterns are sewed continuously can be displayed by adding a menu portion capable of inputting information such as sewing number and/or pattern number and a program for processing the respective sewing times on the basis of such information.

Figure 5:
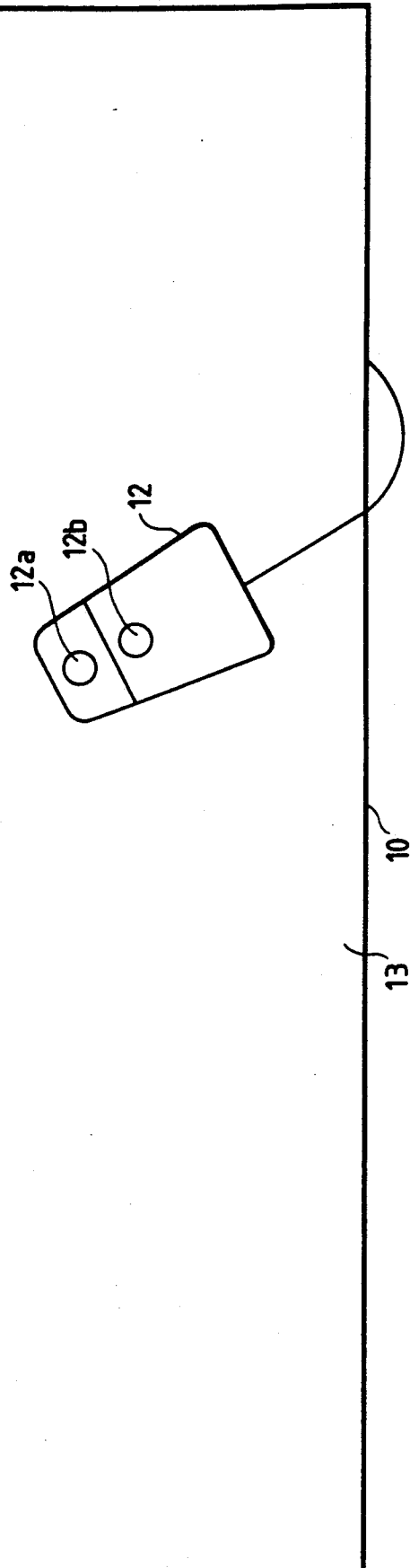
FIG. 5 shows a tablet digitizer and a cursor according to another embodiment of the present invention.
Figure 6A:
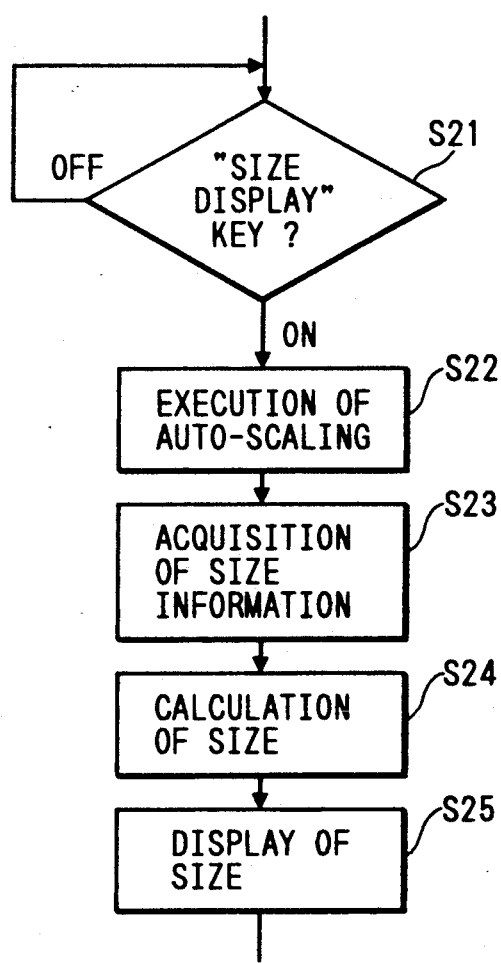
FIGS. 6a and 6b show an operation flowchart of the second embodiment.
Figure 6B:
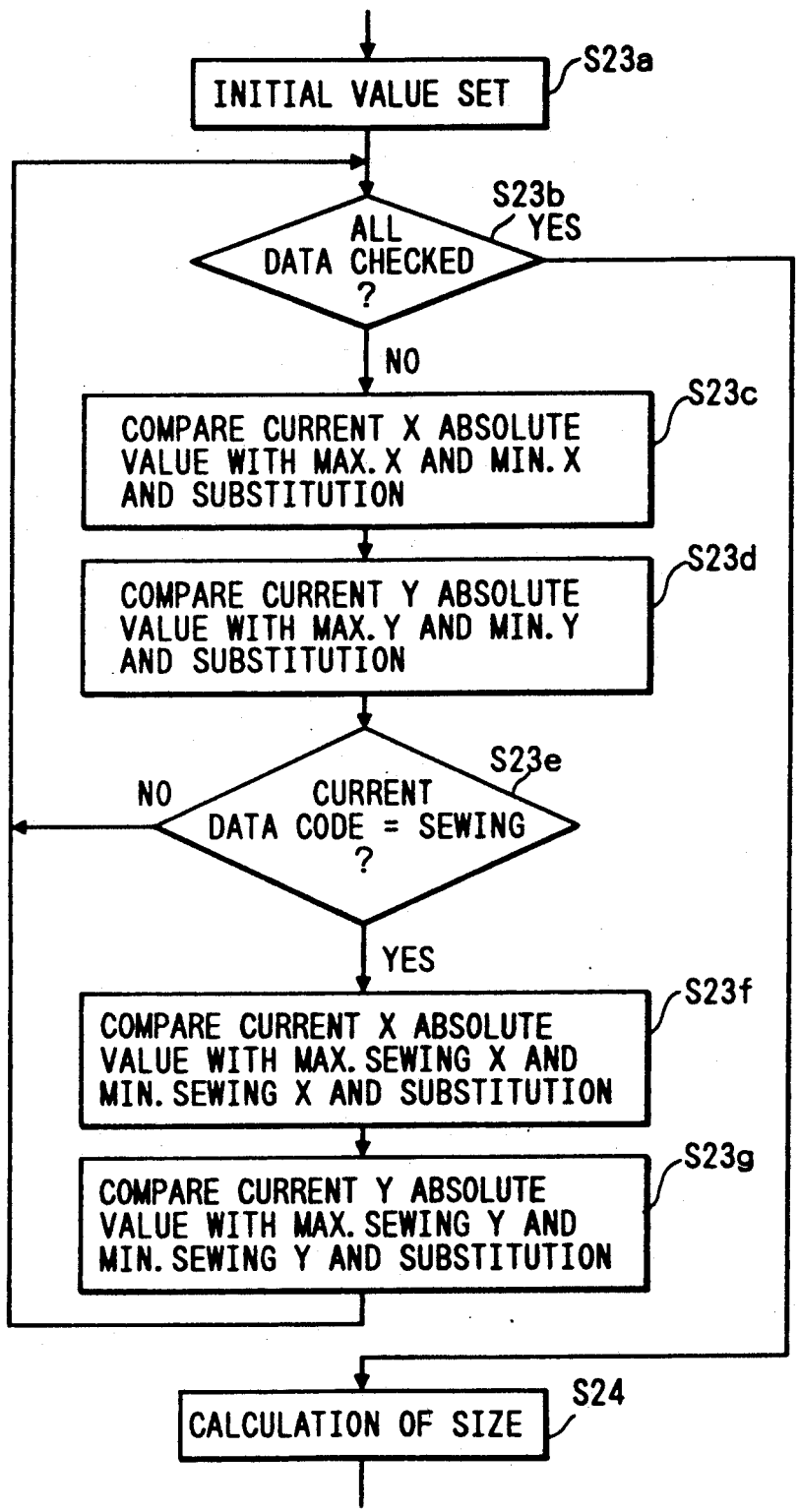
Figure 7:
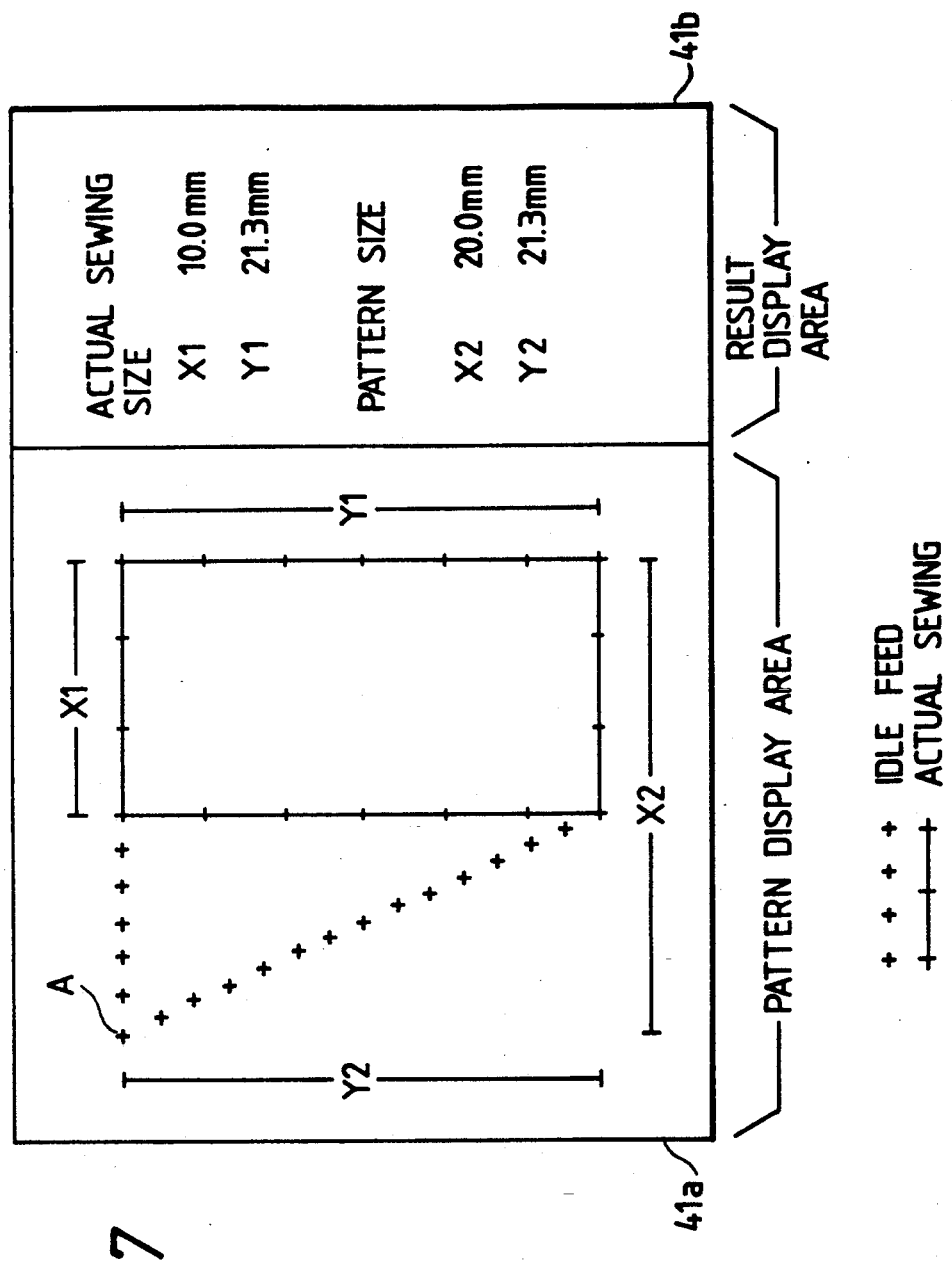
FIG. 7 shows an example of display.
Figure 8:
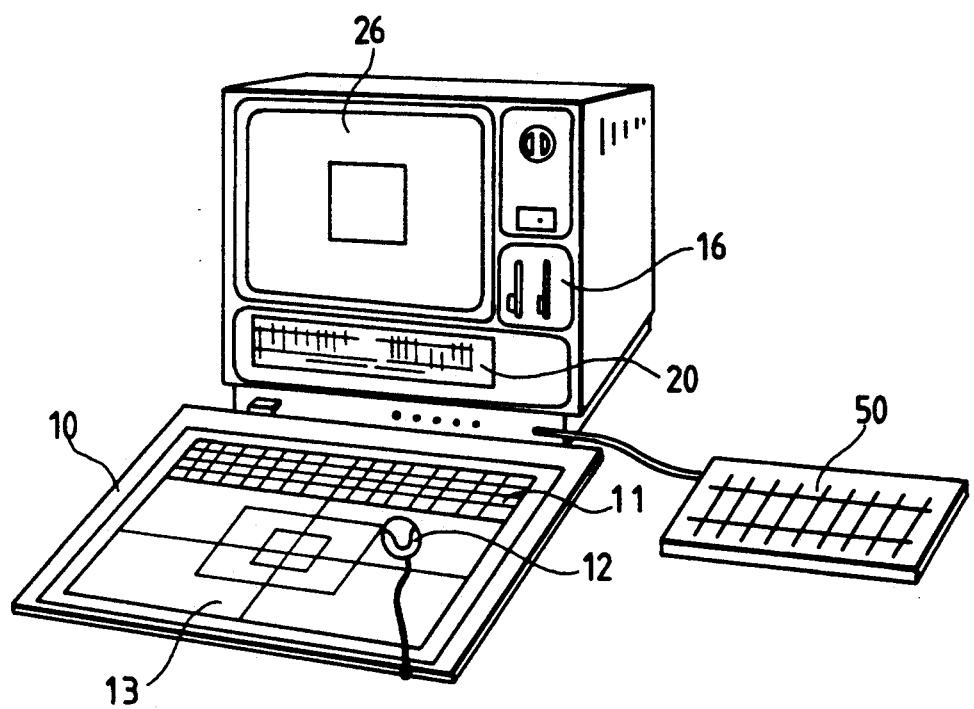
FIG. 8 is a perspective view of a sewing data preparing apparatus of a conventional sewing machine.
Figure 9:
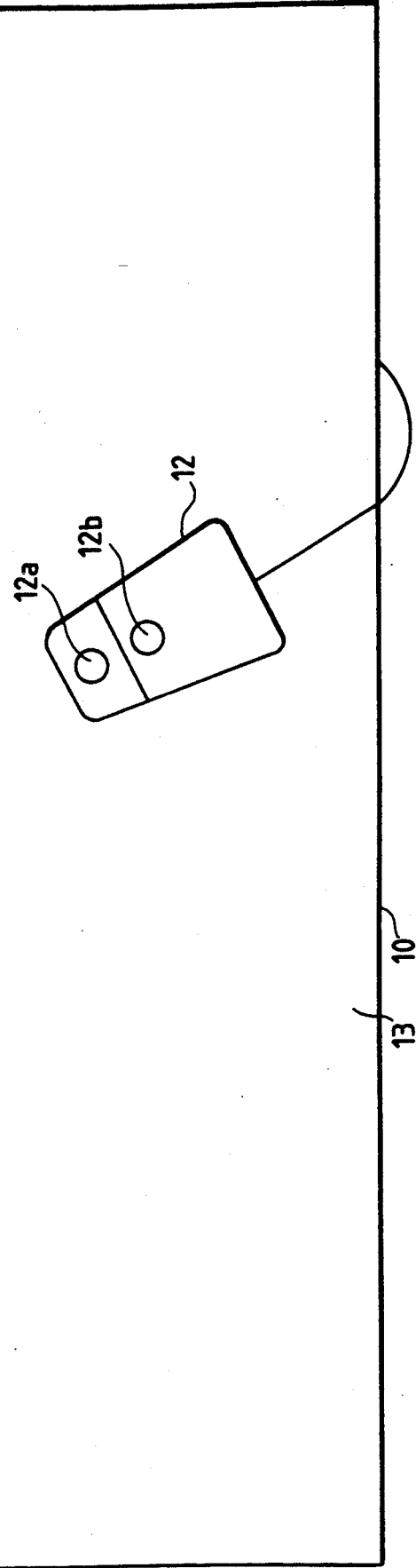
FIG. 9 shows a conventional tablet digitizer and a cursor associated therewith.

Although the embodiment in which the sewing time is operated and displayed has been described, FIGS. 5 to 7 show another embodiment in which the sewing size is operated and displayed.

FIG. 5 shows a construction of a tablet digitizer and a cursor adapted to operate and display a sewingsize. In this figure, 10 is the tablet digitizer, 11A is a menu portion having additionally "size display" for instructing a display of pattern size. Other constructive features of this menu portion are the same as those of the conventional one and its hardware is also similar to the conventional one.

Its concrete operation will be described with reference to FIGS. 6 and 7 using the stitch pattern shown in FIG. 11 as an example.

It is noted that the data input method is similar to that of the conventional sewing data preparing apparatus.

FIGS. 6a and 6b show a flowchart of this invention and the operation will be described with reference to this flowchart.

When the switch 12b of the cursor 12 shown in FIG. 5 operates "size display", the operation enters into a mode of calculation and display of the size of sewing data in the step S21. In the step S22, an auto-scaling is performed such that, to facilitate the display of size, a display power and a center of display are automatically set. In the step S23, the maximum value and the minimum value of vertical and lateral size are checked from an absolute value of the sewing data, the size is calculated according to these information in the step S24 and the size is displayed on the CRT in the step S25.

Next, the size information acquisition in the step S23 will be described with reference to FIG. 6b. In the step S23a, an absolute value of a first stitch data (original point data) X.Y is set as an initial value in the memory region of the maximum X.Y of the pattern to be obtained, the minimum X.Y of the pattern, the minimum sewing X.Y and the maximum X.Y of sewing. The pattern here means a pattern including an original point of the sewing machine (point A in FIG. 7). In the step S23b, it is determined whether or not all data are checked and, if yes, the size is calculated in the step S24 by obtaining a difference between the maximum value and the minimum value. If there is any data to be checked, an absolute value of the current data is compared in the step S23c with the maximum and minimum X values of pattern in the past. If the absolute value of the current data is larger than the maximum X, the latter is substituted by the current data and, if the current data is smaller than the minimum X value, the minimum X value is substituted by the current data. The current data Y is compared in the same manner (S23d).

Further, in the step S23e, it is determined whether or not the code of the current data is the sewing. If yes, the absolute value of the current data is compared with the maximum sewing value and the minimum sewing value and used as substitution for them in the similar manner to those performed in the steps S23c and S23d. This comparison and substitution is repeated certain times corresponding to the number of stitches for one pattern.

FIG. 7 shows an example of the display in one embodiment of the present invention. The pattern size is displayed in two directions, vertical and lateral, and a size corresponding to a symbol (X1, X2, Y1, Y2) displayed on a pattern display area 41a is displayed in a result display area 41b with using 0.1 mm as unit.

Although, in the description of one embodiment, only the size of the whole pattern data and the size of the sewing portion are obtained, it is possible to display a size up to an instructed position by adding a menu portion capable of inputting position instruction and stitch number instruction, etc., and a program for checking the size up to the instructed position and displaying it according to these input information.

An error display becomes possible by adding a menu portion capable of not only displaying the size but also inputting the machine type information and a program for checking whether the sewing range of the sewing machine is exceeded according to these input information and displaying it by an error display.

Further, although, in the above description, the sewing time display and the size display are performed separately, these displays may be done simultaneously.

Although, in the above description, the case in which the sewing time and the size can be obtained by operating and processing the input data, is described it is of course possible to construct it such that other sewing information obtainable by operation of the input data (for example, sewing information of a sewing path along which a sewing is performed according to inputted information) is operated and displayed.

As described, according to the present invention, it becomes possible to know a sewing information such as sewing time and sewing size precisely and quickly before a sewing machine is actually driven, so that sewing step after the data input, that is, after the inputted sewing data is corrected machine, can be done quickly. That is, sewing information such as sewing time and sewing size etc., is obtained prior to an actual driving of the sewing machine and displayed on the display means.

Further, sewing information such as sewing time and sewing size etc., is obtained for each segment of the sewing path prior to an actual driving of the sewing machine and the obtained information is displayed on the display means. The sewing time is obtained for each type of sewing machine prior to an actual driving of the sewing machine and the obtained sewing time is displayed on the display means.

Still further, a lateral and longitudinal size of at least either of pattern size and sewing size prior to an actual driving of the sewing machine and the obtained size is displayed on the display means.

Although the present invention has been described hereinbefore with reference to an industrial sewing machine as an example of the industrial machine, the present invention is not limited to such sewing machine. For example, the present invention can be equally applied to a welding machine or other machines so long as they work along a given path. Further, it should be noted that the described embodiments can be modified or changed in manners apperent to those skilled in the art.

What is claimed is:
1. A data preparing apparatus comprising:
   input means for inputting coordinate data relating to a configuration and pattern to be processed, and for inputting predetermined processing conditions;
   memory means for converting said coordinate data inputted by said input means into variable coordinate data, variable with respect to said predetermined processing conditions, and for storing said variable coordinate data as pattern data to be used in said processing;
   predicting means for predicting processing information actually obtained from said processing performed on the basis of said pattern data stored in said memory means; and
   output means for outputting said processing information predicted by said predicting means.

2. The data preparing apparatus claimed in claim 1, wherein said processing information includes at least one of a processing time, an area to be processed and a processing path.

3. The data preparing apparatus claimed in claim 1, wherein said predicting means calculates a processing time according to a preset processing rate.

4. A data preparing apparatus for a sewing machine, comprising:
   input means for inputting coordinate data of a pattern to be stitched by the sewing machine, and for inputting operational data related to the sewing machine;
   predicting means, responsive to the coordinate data and the operational data, for predicting information related to a sewing operation; and
   display means for displaying the information predicted by said predicting means.

5. A data preparing apparatus for a sewing machine, comprising:
   input means for inputting information comprising a collection of stitch data, each of said stitch data including a feed amount and sewing control information;

memory means for storing said information inputted by said input means;

predicting means for predicting, on the basis of said information inputted by said input means and stored in said memory means, sewing information to be obtained by actually driving said sewing machine; and output means for outputting said sewing information predicted by said predicting means.

6. A data preparing apparatus for a sewing machine, comprising:

input means for inputting sewing related data;

predicting means for predicting, by processing said sewing related data, sewing information including a sewing path to be obtained by actually driving said sewing machine;

segmentation means for segmenting said sewing path produced by said predicting means according to said sewing related data inputted by said input means; and output means for outputting said sewing information obtained by said predicting means, for every segment of said sewing path segmented by said segmentation means.

7. A data preparing apparatus for a sewing machine, comprising:

input means for inputting sewing related data;

segmentation means for segmenting a sewing path produced according to said data inputted by said input means;

predicting means for predicting, by processing said sewing related data, a sewing information to be obtained by actually driving a sewing machine, for each segment of said sewing path segmented by said segmentation means; and display means for displaying said sewing information obtained by said predicting means.

8. The data preparing apparatus claimed in any of claims 4 to 7, wherein said sewing information includes at least one of sewing time, size of sewing area and sewing path.

9. The data preparing apparatus claimed in claim 8, wherein said predicting means predicts the sewing time according to a preset sewing rate.

10. The data preparing apparatus claimed in claim 9, wherein said preset sewing rate is a unit feed amount of cloth for each stitch corresponding to the rotation number of said sewing machine.

11. The data preparing apparatus claimed in claim 10, wherein, a plurality of said unit feed amounts are set and selactable.

12. A data preparing apparatus for a sewing machine, comprising:

input means for inputting sewing related data;

memory means for storing sewing speed data unique to each respective type of sewing machine;

selection means for selecting one of said types of sewing machine;

predicting means for predicting, on the basis of said sewing related data and said speed data stored in said memory means, a sewing time to be obtained by actually driving a sewing machine, for each type of sewing machine; and display means for displaying said sewing time obtained by said predicting means.

13. The data preparing apparatus claimed in claim 8, wherein said predicting means provides a size of area to be sewed by obtaining coordinate positions of the maximum and the minimum pattern data or sewing data.

14. The data preparing apparatus claimed in claim 13, wherein said predicting means compares said size of area to be sewed with a size of area able to be sewed by said sewing machine.

15. The data preparing apparatus claimed in claim 13, wherein said predicting means compares said size of area to be sewed with a size of area able to be sewed by said sewing machine and provides an error indication when said area to be sewed is larger than said area able to be sewed.

16. A data preparing apparatus for a sewing machine, comprising:

input means for inputting sewing related data;

predicting means for predicting, on the basis of said sewing related data, vertical and lateral sizes of at least one of a pattern size and a sewing size to be obtained by actually driving a sewing machine; and display means for displaying said size obtained by said predicting means.

* * * * *